United States Patent [19]
Kolbe et al.

[11] Patent Number: 4,615,906
[45] Date of Patent: Oct. 7, 1986

[54] METHOD AND DEVICE FOR SURFACE TREATMENT OF FILM WEBS

[75] Inventors: Andreas Kolbe, Wiesbaden; Peter Dinter, Oestrich-Winkel, both of Fed. Rep. of Germany

[73] Assignee: Hoechst Aktiengesellschaft, Frankfurt am Main, Fed. Rep. of Germany

[21] Appl. No.: 726,455

[22] Filed: Apr. 24, 1985

[30] Foreign Application Priority Data

May 4, 1984 [DE] Fed. Rep. of Germany ....... 3416405

[51] Int. Cl.$^4$ ............................................. B05B 3/06
[52] U.S. Cl. .................................... 427/40; 427/255.1
[58] Field of Search .............................. 427/40, 255.1

[56] References Cited

U.S. PATENT DOCUMENTS

| | | | |
|---|---|---|---|
| 3,057,792 | 10/1962 | Frohlich | 204/165 |
| 3,142,630 | 7/1964 | Antokal et al. | 204/162 |
| 3,274,089 | 9/1966 | Wolinski | 204/165 |
| 3,296,011 | 1/1967 | McBride et al. | 117/47 |
| 3,959,567 | 5/1976 | Bradley | 428/461 |
| 4,239,973 | 12/1980 | Kolbe et al. | 250/531 |

FOREIGN PATENT DOCUMENTS 938325 10/1963 United Kingdom .
48-017747 5/1973 Japan .

Primary Examiner—Bernard D. Pianalto
Attorney, Agent, or Firm—James C. Lydon

[57] ABSTRACT

A method for surface treatment of a substrate made of thermoplastic plastic is described, wherein the substrate is guided into the zone of a corona discharge flowing between two electrodes charged with high electrical voltage. The characterizing feature of the method comprises subjecting at least one surface of the substrate, simultaneously with corona treatment, to reactive ionized substances from the the liquid phase in the corona discharge zone.

In addition, a device for working the method recited hereinabove is described, comprising a support surface and a high-voltage electrode, said electrode being connected to a high-voltage generator via a high-voltage cable. The characterizing features of the device comprise the high-voltage electrode being a shaped electrode open toward the supporting surface, which is filled with a liquid.

10 Claims, 6 Drawing Figures

METHOD AND DEVICE FOR SURFACE TREATMENT OF FILM WEBS

BACKGROUND OF THE INVENTION

The invention relates to a process for surface treatment of substrates composed of thermoplastic plastics. The invention also includes a device for working the method.

In film manufacture, the conventional state of the art includes subjecting film surfaces to an electrical corona treatment to increase the bonding strength or to achieve improved printability. The function of this process provides for guiding the film to be treated over an electrically grounded support surface, which in most cases is a rotatable roller, as well as subjecting the side of the film facing away from the supporting surface to an electrical corona discharge, generated by supplying an electrode, located at a distance from the support surface, with a high frequency, high-voltage alternating current. Over the years, a wide variety of electrode designs have been developed as for example plate, wire, comb, knife, half-dish, spring, or spindle electrodes made of a wide variety of materials as for example metals, metal oxides, or, increasingly in recent times, oxide ceramics, which however change nothing as far as the principle of the procedure is concerned.

Usually, surface treatment is performed under atmospheric pressure and in the presence of air. The search for a way of increasing pretreatment effectiveness has led to the development of methods using substances capable of reacting chemically. Such methods are described for example in U.S. Pat. No. 3,142,630, British Pat. No. 938,325 and U.S. Pat. No. 3,274,089 among others.

The characterizing feature of all these technologies is blowing gases capable of reacting into the corona discharge ignited between the two electrodes.

An expanded embodiment of this method is the so-called plasma processing, which is charactrized by the fact that the process is conducted in a vacuum to increase the kinetic energy of the ions and electrons in the electrical field. U.S. Pat. No. 3,057,792 is cited as representative of this type of processing.

As is evident from the description of the state of the art, only gases are generally used as the reactive media. Consequently, an object of the present invention was to develop a process which also allows using reactive substances in liquid form, thus considerably expanding the possibilities of surface modification.

BRIEF SUMMARY OF THE INVENTION

The present invention relates to a method for corona treatment of at least one surface of a moving thermoplastic substrate comprising
(i) guiding said substrate over an electrically grounded support surface which is in close proximity to a high voltage electrode;
(ii) supplying a liquid to said electrode;
(iii) supplying high voltage alternating current to said electrode such that an electrical corona discharge is formed between said electrode and said electrically grounded support surface, said corona discharge passing through said thermoplastic substrate; and
(iv) simultaneously subjecting the surface of said thermoplastic substrate to ionized substances which were dissolved in said liquid or generated in situ from said liquid.

The present invention also relates to a corona discharge electrode comprising a conductive material encased in a base of non-conductive material, the top of said base having a depression containing a liquid, wherein said conductive material forms at least a portion of the lower or bottom area of said depression, such that a corona discharge must pass through said liquid, with the opposite end of said conductive material exiting said base and adapted to receive high voltage alternating electrical current.

DETAILED DESCRIPTION OF THE INVENTION

The object of the invention is achieved by the method recited hereinabove, whose characterizing feature comprises subjecting at least one surface of the substrate simultaneously with corona processing in the corona discharge zone to reactive ionized substances from the liquid phase. In particular, the substrate is provided in web form, preferably in the form of a film.

In the preferred embodiment of the invention, the ionized substances are introduced from the liquid state or from a state in which they are dissolved in a liquid, into the corona discharge zone. It must be considered especially surprising that the method is feasible in this form, since in previous attempts in which liquids were introduced into conventional corona discharge equipment, the entrained liquid led to short circuits and/or breakdown of the dielectric, and consequently, destruction of the films being processed.

The process according to the invention can therefore not be worked with conventional equipment, but a device is required in which whatever liquid is used for the method the liquid is as an "active" electrode, a necessary component of the electrode system, i.e. the liquid is used to form the corona discharge. By direct involvement of the liquid in the discharge process, reaction mechanisms are triggered which are reflected in a chemical modification of the surface of the film under treatment. Depending on the nature of the liquid used, active centers in the form of functional groups and radicals are formed on the plastic surface under treatment, which constitute reactants for subsequent processes.

The device for working the method comprises a grounded support surface over which the substrate is guided and a high-voltage electrode. The shaped electrode preferably comprises dielectric materials such as glass, ceramic, porcelain, or plastic and is in the shape of a trough open at the top, a groove, a shell, or a depression, which can be filled with liquid.

The liquid is preferably an inorganic or nonflammable organic liquid, especially preferably an aqueous solution. In particular aqueous solutions of organic acids such as acetic acid, propionic acid, halogen acetic acid, e.g. trichloroacetic acid, oxalic acid, malonic acid or hydroxycarboxylic acids or mixtures or salts thereof may be used. In addition, aqueous solutions of inorganic acids or alkalis or their salts may be used, as for example example sulfuric acid or sulfates, hydrochloric acid or chlorides, chlorites, chlorates, sodium hydroxide, potassium hydroxide or corresponding hydroxy compounds or ammonia or ammonium salts. In addition organic solvents may be used, preferably those that are miscible with water. Examples are alcohols such as ethanol or methanol, ketones such methylethylketone or acetone, dimethylformamide, dimethylsulfoxide, tetrahydrofuran, etc. This list of liquids or liquid additives is not intended to be exhaustive and merely constitutes a fraction of the large number of possible variations in surface treatment of plastic substrates that can be accomplished with the method according to the invention.

The device by which the process according to the invention is worked will now be described with reference to the drawings for improved understanding.

Figure 1:
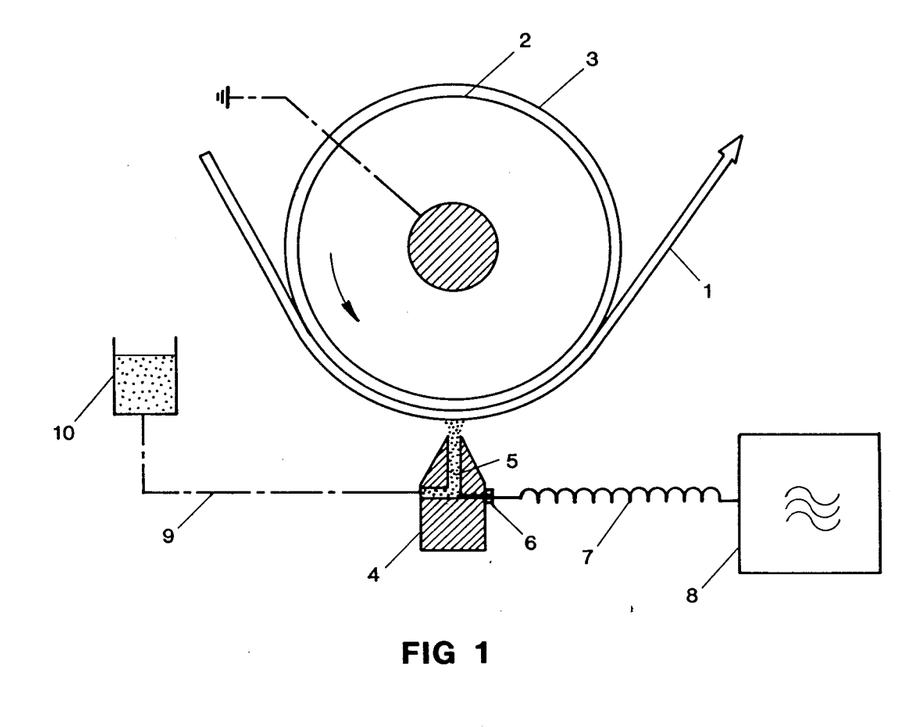
FIG. 1 is a schematic diagram of the simplest embodiment of the device.

Referring to FIG. 1, the characterizing feature of the device consists in the fact that the high-voltage electrode is a shaped electrode 4 open toward the support surface, said electrode being filled with a liquid 5. The support surface is preferably designed in the form of a roller 2 coated with an insulating layer 3.

Liquid 5 should preferably fill shaped electrode 4 up to the rim and be charged with a high-frequency, high-voltage alternating current through a contact pin 6, connected to generator 8 via a high-voltage cable 7 and immersed in shaped electrode 4. In this manner a corona discharge is ignited between roller 2 and liquid 5 through which discharge substrate web 1 to be treated is guided. Since liquid 5 is identical with the live electrode, it is necessarily incorporated into the discharge mechanism, i.e. release of electrons, ionization, and excitation of molecules. Depending on the nature of the liquid used, chemical reactions are triggered which are reflected in a chemical modification of the substrate surface. Since the process according to the invention involves consumption of liquid, a supply tank 10, connected via an insulated tube 9 with shaped electrode 4, keeps it continuously filled with liquid.

Figure 2:
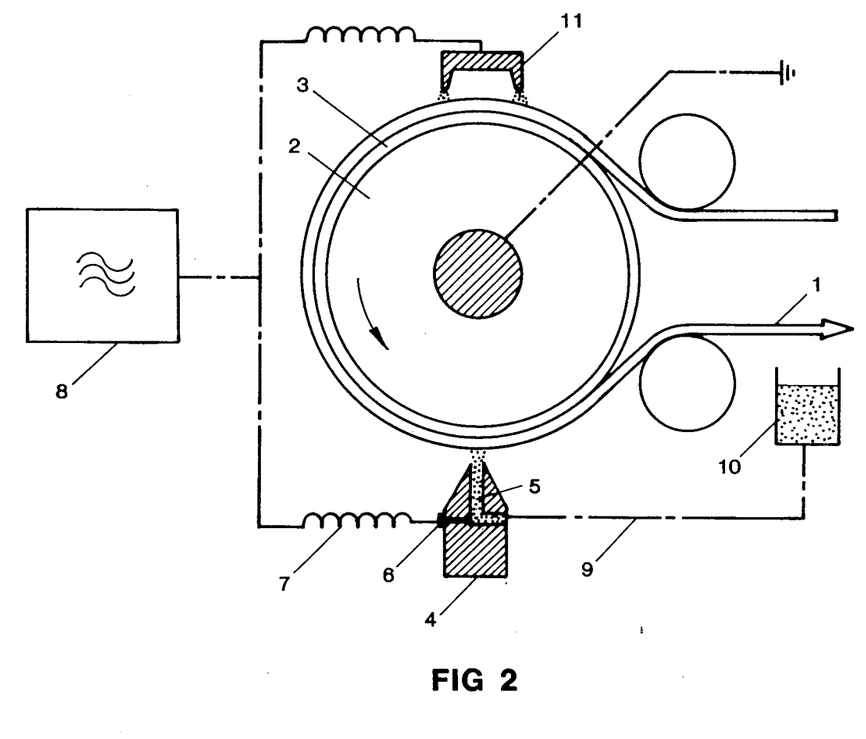
FIG. 2 is a schematic view of a device supplemented by a conventional corona processing device.

In contrast to the version shown in FIG. 1, the device shown in FIG. 2 is a combination of the method according to the invention with a conventional corona treatment. Electrode 11, additionally provided above roller 2, serves to activate the film surface before the actual processing step according to the invention. The two electrodes 4 and 11 can either be energized by a single generator or each can be individually energized by a separate high-voltage device.

Figure 3:
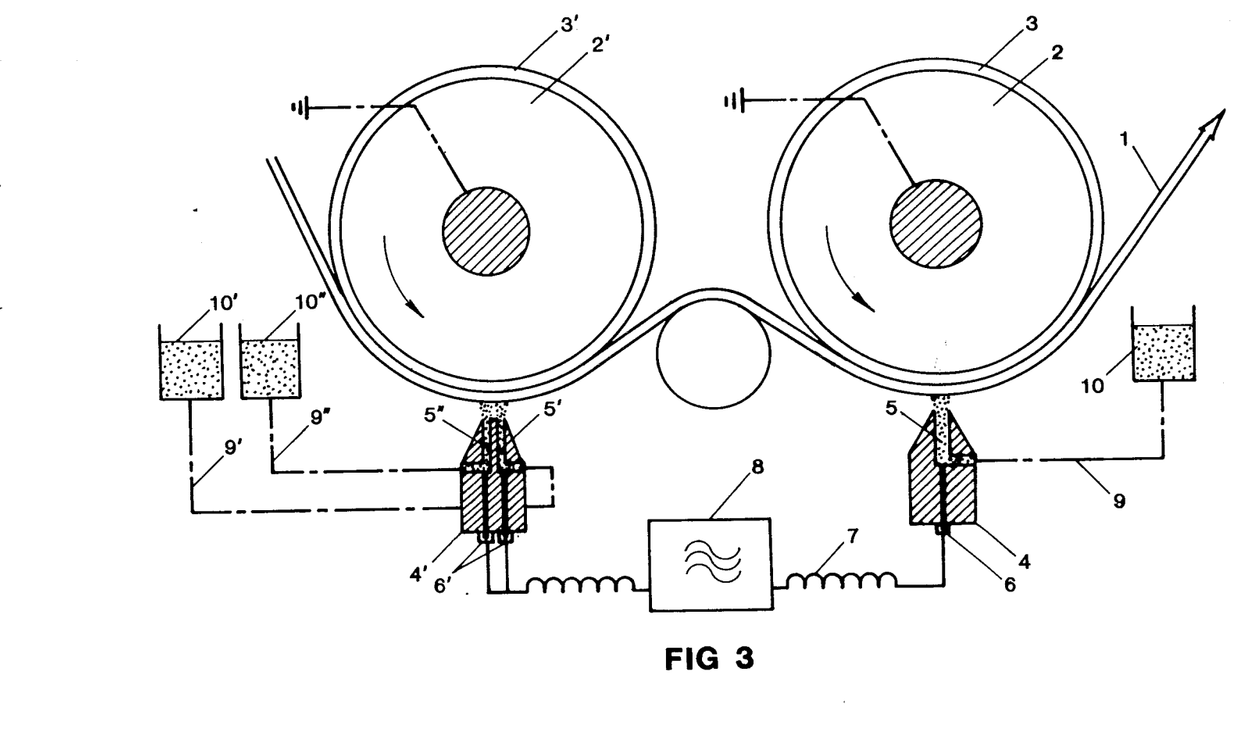
FIG. 3 shows a device according to the invention in schematic form in which the substrate can simultaneously be processed with different liquids.

The pre-processing station shown in FIG. 3 allows the method according to the invention to be worked in a plurality of successive steps, whereby different liquids can be used. Accordingly the system is equipped with two pretreatment rollers 2, 2' with dielectric insulating layers 3,3'. The two rollers have differently shaped electrodes 4, 4' to receive processing liquids 5, 5', 5". The liquids move from supply tanks 10, 10', 10" through tubes 9, 9', 9" to shaped electrodes 4, 4'. Liquids 5, 5', 5" can be energized with high-frequency, high-voltage alternating current from generator 8 via contact pins 6, 6', and high-voltage cable 7. In this fashion, film web 1 passing through the tandem arrangement can be processsed successively with different reaction media. Depending on the nature of the substances used, polymerizable or cross-linking coatings can be applied to the film surface in this manner.

Figure 4:
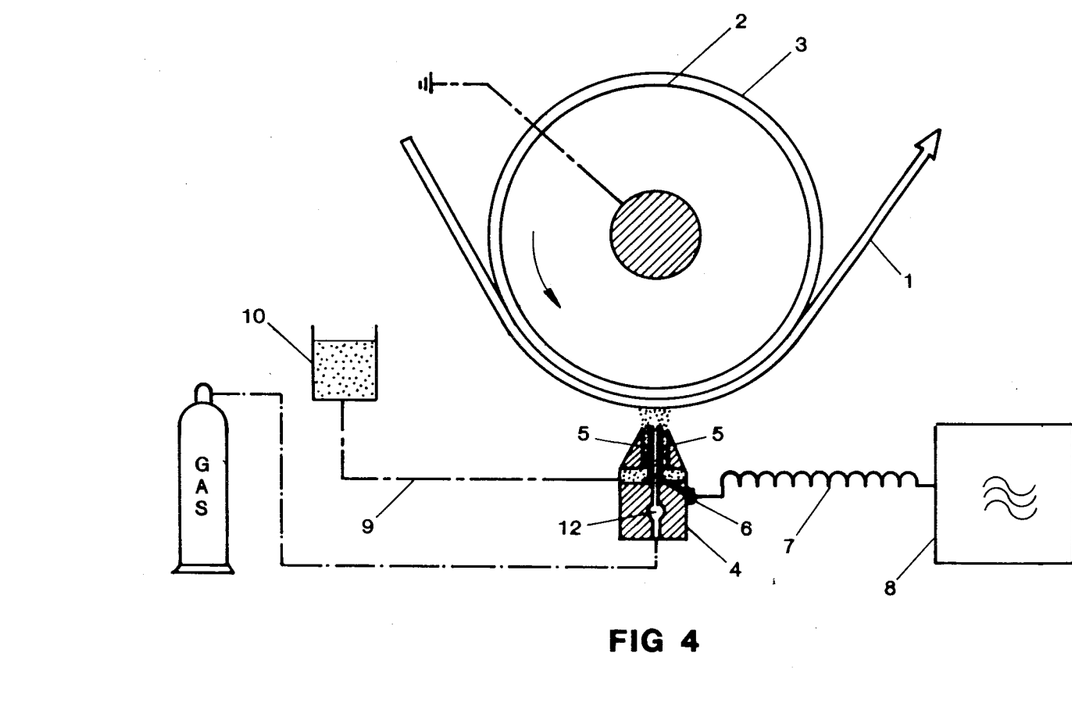
FIG. 4 shows a schematic diagram of a device according to the invention in which a gas exposure can simultaneously be conducted.

The version of the device shown in FIG. 4 makes it possible to combine the processing method according to the invention with a gas treatment. Gases blown through a gas jet 12 directly into the discharge area can engage in reactions with products produced in the corona discharge between the liquid and the opposite electrode, said reactions triggering corresponding chemical changes in the surface of the film.

The use of the method according to the invention described above and all of its variations is not linked to particular working conditions. It can be used both under normal atmospheric pressure and in a vacuum.

One parameter which influences the processing result is the electrical conductivity of the liquid used for the process. Normally the liquids used have a sufficiently high conductivity to allow the process to be worked with satisfactory results. However if liquids with low conductivities must be used, especially nonionic organic liquids, it has been found especially favorable in practice for a metal electrode, for example a thin wire, to be inserted into the shaped electrode whose position, however, must generally be a few millimeters beneath the surface of the liquid.

In the normal case the liquids can be supplied to the shaped electrode without any special process engineering measures. If necessary it may be advantageous, however, to heat the liquid, in order to compensate for the loss of temperature due to the evaporation heat of the liquid required during processing, whereby the molecular bond becomes more mobile and the liquid consequently becomes more reactive.

The device according to the invention differs from known corona devices especially by virtue of the novel electrode. As far as achieving a high energy density on the electrode is concerned, it has been found advantageous to keep the surface of the electrode involved in the discharge as small as possible in order to produce a sharply focused corona discharge. This requirement is met by the shaped electrodes shown in FIGS. 1 to 4 which have narrow grooves or gutters only about 3 to 4 mm wide. As shown in FIG. 3, the use of shaped electrodes with one or even more grooves is possible.

The shaped electrode is connected to the high-voltage generator through a metal contact which projects into the groove filled with liquid.

Alternatively to the electrode design described hereinabove, wherein the shaped electrode filled with liquid serves as the live electrode and the roller serves as the grounded opposite electrode, a reversal of this arrangement is also possible. In this case it has been found advantageous to replace the metal roller body with a dielectric layer, that serves as the support surface, by the roller design described in European Pat. No. 0,002,453 and to make the shaped electrode filled with liquid serve as the grounded opposite electrode. This roller design makes it possible to use the version of the method shown in FIG. 2 involving double processing in a simple and elegant fashion.

It was found in the course of practical testing of the method and the device according to the invention that, almost without exception, all the corona generators offered on the market are suitable as electrical supply units, regardless of what initial frequency they delivered.

Since the discharge process involves consumption of the liquid being used, provision must be made to top up the liquid continuously. This can be accomplished in simplest fashion by using reservoirs with free feed or alternatively thereto, metering pumps.

The present method according to the invention for modification of plastic surfaces by corona discharge, by involving liquids in the discharge process, expands the possibilities of chemical changes in plastics considerably. Depending on the nature of the liquids used, appropriate surface treatments can be undertaken in the successive finishing steps such as coating, printing, laminating, metallizing and the like.

The method according to the invention has been found to be especially suitable for pretreatment of film webs to be subsequently processed into laminates. The surfaces of two independent film webs are processed separately by the method and then brought together while subjecting them to pressure and heat, whereby a permanent solid connection between the film webs is achieved.

EXAMPLES

Without further elaboration, it is believed that one of ordinary skill in the art can, utilizing the preceding description, practice the invention to its fullest extent. The following specific embodiment is therefore intended to be illustrative only, and not intended to limit the scope of the invention in any way.

Example

The surface of a polyethylene terephthalate film 50 microns thick was processed according to the method of the present invention. The liquid was an aqueous ammonia solution with a 30% concentration. The film was run past the processing station at a speed of 20 meters per minute. The gap between the electrode and film was 2 mm and the power of the medium-frequency generator used was 1000 W at 24 kHz.

Figure 5:
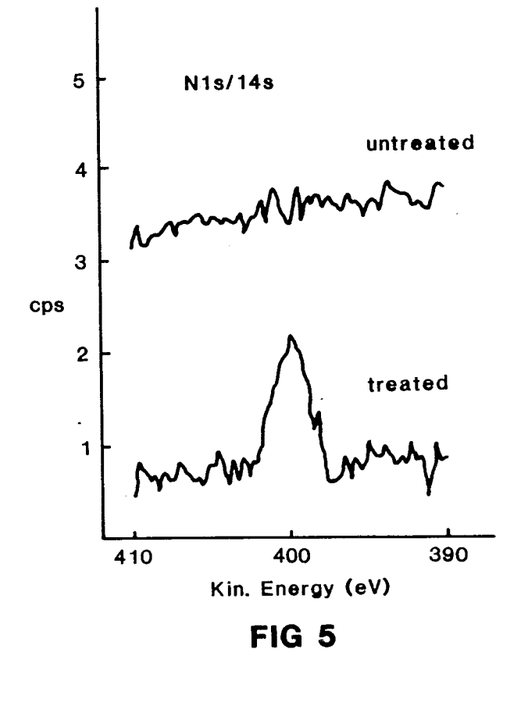
FIG. 5 is a graph depicting experimental results of a film sample analyzed by electron spectroscopy chemical analysis (ESCA).

A film thus treated was studied using the ESCA spectroscopy method (electron spectroscopy chemical analysis). In this method, the kinetic energy of electrons leaving the molecular bond is determined and compared with X-radiation radiated at constant energy. A nontreated polyethylene terephthalate film was studied in the same way. The results are shown in FIG. 5.

Figure 6:
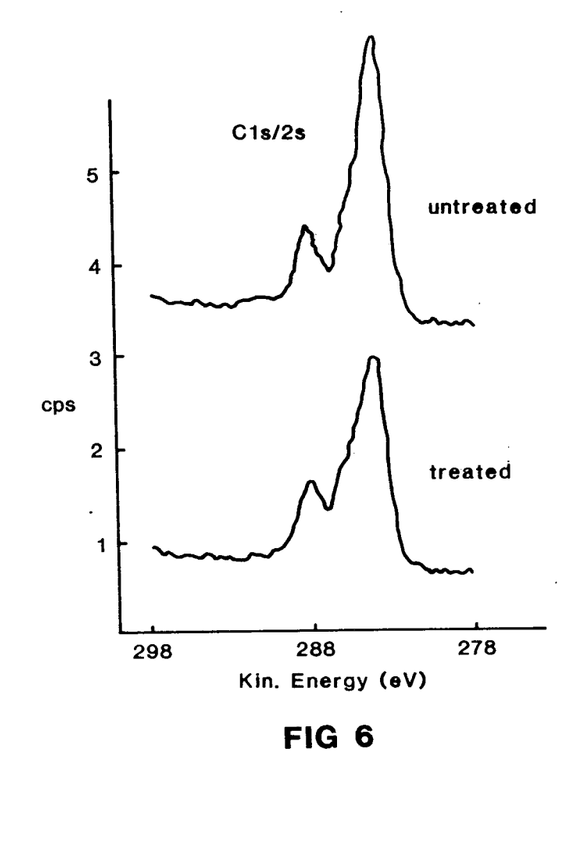
FIG. 6 is a graph depicting experimental results of a film sample analyzed by electron spectroscopy chemical analysis (ESCA).

The untreated film shows no sign whatever of the presence of nitrogen while the film processed as described above shows a clear maximum in the energy range characteristic of nitrogen (400 electron volts). Surprisingly an effect was also observed in the range of energies characteristic of carbon (approximately 285 electron volts). This is shown in FIG. 6.

We claim:

1. A method for corona treatment of at least one surface of a moving thermoplastic substrate comprising:
   (i) guiding said substrate over an electrically grounded support surface which is in close proximity to a high voltage electrode;
   (ii) supplying an aqueous solution consisting essentially of water and a solute selected from the group consisting of organic acids, inorganic acids, inorganic bases, and the salts thereof to said electrode;
   (iii) supplying high voltage alternating current to said electrode such that an electrical corona discharge is formed between said electrode and said electrically grounded support surface, said corona discharge passing through said thermoplastic substrate;
   (iv) simultaneously subjecting the surface of said thermoplastic substrate to at least one ionized substance which was either dissolved in said solution or generated in situ from said solution.

2. The method of claim 1 wherein said substrate is in the form of a web.

3. The method of claim 1 further comprising subjecting said moving thermoplastic substrate to at least two corona treatment processing steps.

4. The method of claim 3 wherein at least two of said corona treatment processing steps include simultaneously subjecting the surface of said moving thermoplastic substrate to at least one ionized substance which was either dissolved in said liquid or generated in situ from said liquid.

5. The method of claim 3 wherein at least two different ionized substances are employed.

6. The method of claim 3 further comprising simultaneously subjecting the surface of said moving thermoplastic substrate to reactive gases.

7. The method of claim 1 wherein said aqueous solution consists essentially of water and ammonia.

8. The method of claim 7 wherein said substrate is polyester film.

9. The method of claim 8 wherein said high voltage alternating current is about 1000 watts at a frequency of about 24 kilohertz.

10. The method of claim 9 wherein said polyester film is guided over said electrically grounded support surface at a speed of about 20 meters/minute.

* * * * *

UNITED STATES PATENT AND TRADEMARK OFFICE
CERTIFICATE OF CORRECTION

PATENT NO. : 4,615,906

DATED : October 7, 1986

INVENTOR(S) : Andreas Kolbe et al.

It is certified that error appears in the above-identified patent and that said Letters Patent is hereby corrected as shown below:

Column 6, Claim 4, lines 37 and 38, "liquid", both occurrences, should read -- aqueous solution --.

Signed and Sealed this

Seventeenth Day of March, 1987

Attest:

DONALD J. QUIGG

*Attesting Officer*         *Commissioner of Patents and Trademarks*